(12) United States Patent
Holz et al.

(10) Patent No.: US 11,572,056 B2
(45) Date of Patent: Feb. 7, 2023

(54) BLOCKCHAIN BASED ECOSYSTEM FOR EMISSION TRACKING OF PLUG IN HYBRID VEHICLES

(71) Applicant: Ford Global Technologies, LLC, Dearborn, MI (US)

(72) Inventors: Alexandra Holz, Aachen (DE); Roy Hendrikx, Kinrooi (BE); Martin Wiecker, Würselen (DE); Stuart Easson, Santa Cruz, CA (US); Detlef Kuck, Inden (DE)

(73) Assignee: Ford Global Technologies, LLC, Dearborn, MI (US)

(*) Notice: Subject to any disclaimer, the term of this patent is extended or adjusted under 35 U.S.C. 154(b) by 163 days.

(21) Appl. No.: 16/862,423

(22) Filed: Apr. 29, 2020

(65) Prior Publication Data
US 2020/0346634 A1    Nov. 5, 2020

(30) Foreign Application Priority Data
Apr. 30, 2019    (DE) .......................... 102019206211.3

(51) Int. Cl.
*B60W 20/16*    (2016.01)
*B60W 20/40*    (2016.01)
(Continued)

(52) U.S. Cl.
CPC ............ *B60W 20/16* (2016.01); *B60W 20/40* (2013.01); *B60W 30/18009* (2013.01);
(Continued)

(58) Field of Classification Search
CPC ................ B60W 20/16; B60W 20/40; B60W 30/18009; G05D 1/0214;
(Continued)

(56) References Cited

U.S. PATENT DOCUMENTS 5,765,656 A * 6/1998 Weaver ................... B60L 53/11
                                                           180/65.265
6,464,026 B1 * 10/2002 Horsley ................. B60W 20/11
                                                           180/65.25
(Continued)

FOREIGN PATENT DOCUMENTS

CN         107786639 A       3/2018
DE     102016222448 A1 *     5/2018    ............ B60W 20/40
(Continued)

OTHER PUBLICATIONS

Sven Braden, et al., Blockchain Potentials and Limitations for Selected Climate Policy Instruments, Climate Ledger Initiative, Mar. 2019, pp. 1-59, Deutsche Gesellschaft fur Internationale Zusammenarbeit (GIZ) GmbH, Deutschland.

*Primary Examiner* — B M M Hannan
(74) *Attorney, Agent, or Firm* — Brandon Hicks; Kilpatrick Townsend & Stockton LLP

(57) ABSTRACT

Described herein are systems and methods for the provision of data particularly for use in generating a blockchain environment for tracking emissions of a hybrid electric vehicle. The systems and methods include reading in position data representing a geographical position of a hybrid electric vehicle, reading in operating data representing an operating state of a drivetrain of the hybrid electric vehicle, forming a data block at least comprising the position data and the operating data, and adding the data block to a blockchain.

9 Claims, 4 Drawing Sheets

(51) Int. Cl.
*B60W 30/18* (2012.01)
*G05D 1/02* (2020.01)
*H04L 9/06* (2006.01)
*H04W 4/029* (2018.01)
*H04L 9/00* (2022.01)

(52) U.S. Cl.
CPC ......... *G05D 1/0214* (2013.01); *H04L 9/0643* (2013.01); *H04W 4/029* (2018.02); *G05D 2201/0213* (2013.01); *H04L 9/50* (2022.05)

(58) Field of Classification Search
CPC .......... G05D 2201/0213; H04L 9/0643; H04L 2209/38; H04L 9/3297; H04L 9/3239; H04W 4/029; H04W 4/02; H04W 4/021; G07C 5/08; G07C 5/0841; Y02T 90/14
USPC .......................................................... 701/22
See application file for complete search history.

(56) References Cited

U.S. PATENT DOCUMENTS

| | | | | |
|---|---|---|---|---|
| 9,061,680 | B2 * | 6/2015 | Dalum | B60K 25/02 |
| 9,779,557 | B2 | 10/2017 | Hauser et al. | |
| 9,984,522 | B2 | 5/2018 | Ricci | |
| 11,263,641 | B2 * | 3/2022 | Chantz | G06Q 50/06 |
| 2004/0157704 | A1 * | 8/2004 | Stork | F16D 48/062 |
| | | | | 477/166 |
| 2004/0210356 | A1 * | 10/2004 | Wilton | B60L 58/14 |
| | | | | 701/22 |
| 2011/0022259 | A1 * | 1/2011 | Niwa | B60W 10/08 |
| | | | | 903/903 |
| 2011/0056185 | A1 * | 3/2011 | Bradley | F01N 3/00 |
| | | | | 60/285 |
| 2014/0180513 | A1 * | 6/2014 | Kozloski | B60W 10/06 |
| | | | | 903/902 |
| 2016/0075323 | A1 * | 3/2016 | Planche | F16H 61/66227 |
| | | | | 903/945 |
| 2017/0046652 | A1 * | 2/2017 | Haldenby | G06Q 20/065 |
| 2017/0305290 | A1 * | 10/2017 | Huff | B60K 25/10 |
| 2017/0355373 | A1 * | 12/2017 | Dalum | F16H 61/0031 |
| 2017/0364900 | A1 | 12/2017 | Hudson et al. | |
| 2018/0338001 | A1 | 11/2018 | Pereira Cabral et al. | |
| 2018/0342036 | A1 * | 11/2018 | Zachary | H04W 12/10 |
| 2018/0374283 | A1 * | 12/2018 | Pickover | H04L 9/0637 |
| 2019/0107407 | A1 * | 4/2019 | Bucsan | G01C 21/3461 |
| 2019/0143821 | A1 * | 5/2019 | Bell | B60W 10/08 |
| | | | | 180/65.225 |
| 2019/0279227 | A1 * | 9/2019 | Chantz | G06Q 30/04 |
| 2019/0378352 | A1 * | 12/2019 | Dey | G07C 5/008 |
| 2020/0005559 | A1 * | 1/2020 | Grunbok, II | G08G 1/205 |
| 2020/0233973 | A1 * | 7/2020 | Ahmed | G06F 21/6245 |
| 2020/0242646 | A1 * | 7/2020 | Edwards | G06Q 30/0265 |
| 2020/0242858 | A1 * | 7/2020 | Meroux | G07C 5/085 |
| 2020/0296559 | A1 * | 9/2020 | Ahmed | G07C 5/0841 |

FOREIGN PATENT DOCUMENTS

| | | | | |
|---|---|---|---|---|
| EP | 3638529 B1 * | 2/2021 | | B60K 6/48 |
| GB | 2469937 A * | 11/2010 | | B60K 6/105 |
| KR | 101914575 B1 | 11/2018 | | |
| WO | WO-2017027332 A1 * | 2/2017 | | B60K 6/22 |
| WO | WO-2017144425 A1 * | 8/2017 | | B60K 6/24 |
| WO | WO-2017202947 A2 * | 11/2017 | | F01N 9/007 |
| WO | WO-2019156914 A1 * | 8/2019 | | B60W 30/00 |
| WO | WO-2019156916 A1 * | 8/2019 | | G06K 9/00798 |
| WO | WO-2019186221 A1 * | 10/2019 | | B60K 35/00 |

* cited by examiner

BLOCKCHAIN BASED ECOSYSTEM FOR EMISSION TRACKING OF PLUG IN HYBRID VEHICLES

CROSS-REFERENCES TO RELATED APPLICATIONS

This application claims priority under 35 U.S.C. § 119 to German Patent Application No. 102019206211.3, filed on Apr. 30, 2019, entitled COMPUTER-IMPLEMENTED METHOD FOR THE PROVISION OF DATA, the contents of which is hereby incorporated by reference in its entirety for all purposes.

TECHNICAL FIELD

The invention relates to a computer-implemented method for the provision of data.

BACKGROUND

More and more cities or municipal administrations are in particular tending to set up what are known as environmental zones in order to in that way comply with air cleanliness regulations.

An environmental zone (also known as a low-emission region) here is a geographically defined region—usually in municipal conurbations—in which the operation of vehicles that are not identified as having low emissions is forbidden, which is intended to serve to improve the local air quality. There is, in addition, the concept of the zero-emission zone (ZEZ) in which, for example, only electric vehicles are allowed.

A hybrid electric vehicle (HEV) is a vehicle that is driven at least by a motor-driven electrical machine as a traction motor and a further energy converter as a further traction motor—usually a combustion engine such as a gasoline or diesel engine. While the electrical machine is supplied with electrical operating energy from a traction battery, the combustion engine is supplied by combustion fuel from a combustion fuel tank.

Such a hybrid electric vehicle can—depending on its configuration—be operated purely electrically and thus with zero emissions, partially electrically and thus with reduced emissions, and/or purely operated by the combustion engine and thus entailing emissions.

There is thus a need to indicate ways in which such operating states can be documented in a reliable manner that is secure against forgery, in particular within environmental zones.

SUMMARY

The object of the invention is achieved through a computer-implemented method for the provision of data, including reading in position data representing a geographical position of a hybrid electric vehicle, reading in operating data representing an operating state of a drivetrain of the hybrid electric vehicle, forming a data block at least comprising the position data and the operating data, and adding the data block to a blockchain.

To acquire the position data, the hybrid electric vehicle comprises, for example, a GPS module, wherein the position data is transmitted wirelessly, using, for example, a GSM module, to a blockchain environment. The operating data is also transmitted wirelessly to the blockchain environment, for example using the GSM module.

While it is possible to determine on the basis of the position data whether the hybrid electric vehicle is at least some of the time located inside an environmental zone, the operating data indicate whether the hybrid electric vehicle is being operated purely electrically and thus with zero emissions, partially electrically and thus with reduced emissions, and/or purely operated by the combustion engine and thus entailing emissions.

The blockchain environment can be a distributed network that reads in both the position data as well as the operating data. Both the position data and the operating data can each be datasets, e.g., position datasets or operating datasets. The position datasets or operating datasets comprise, in addition to the position data and the operating data, in each case a timestamp in order to be able to associate and evaluate the respective position data and operating data from the point of view of time also. In addition or as an alternative to the timestamps, the position datasets or operating datasets can also comprise information regarding distances traveled in, for example, miles or kilometers. The position data as well as at least the operating data are combined to form a data block, and then added to a blockchain. This data is thus now available in the blockchain in a manner that cannot be forged, in order to be further evaluated.

According to one form of embodiment, the operating state is at least a zero-emission operating state or an operating state entailing emissions. Through evaluating the data stored in the blockchain it is thus possible to establish whether the hybrid electric vehicle was operated in the environmental zone with zero emissions or entailing emissions. This information can, for example, be used to determine emission-dependent toll fees for, for example, driving entailing emissions in an environmental zone.

According to a further form of embodiment, an information signal is provided through evaluating the position data and the operating data. The information signal can be used to inform a driver of the hybrid electric vehicle that he is located in an environmental zone and/or is driving with zero emissions or with reduced emissions or entailing emissions. For this purpose the information signal can operate a visual and/or acoustic indicator. In addition or as an alternative, it can be provided that the information signal leads to a change in the operating mode of the hybrid electric vehicle into a purely electrical operating mode which is thus without emissions.

According to a further form of embodiment, the data block of the blockchain is evaluated in the context of a smart-contract application. In other words, smart contracts are executed. Smart contracts refer here to software-based contracts wherein widely different contractual conditions can be lodged. During the operation of the contract, specific linked actions (e.g. payments) can be executed automatically when a corresponding trigger (e.g. satisfying the contractual conditions) is present. Emission-dependent toll fees can, in this way, for example, particularly easily and automatically be levied and billed.

A computer program product for a hybrid electric vehicle and a computer program product for a blockchain environment, a control device for such a hybrid electric vehicle and a hybrid electric vehicle with such a control device further belong to the invention.

DETAILED DESCRIPTION

As described above, There is a need to indicate ways in which such operating states can be documented in a reliable manner that is secure against forgery, in particular within environmental zones. Described herein are systems and methods for using blockchain technology for emission tracking for hybrid electric vehicles.

Figure 1:
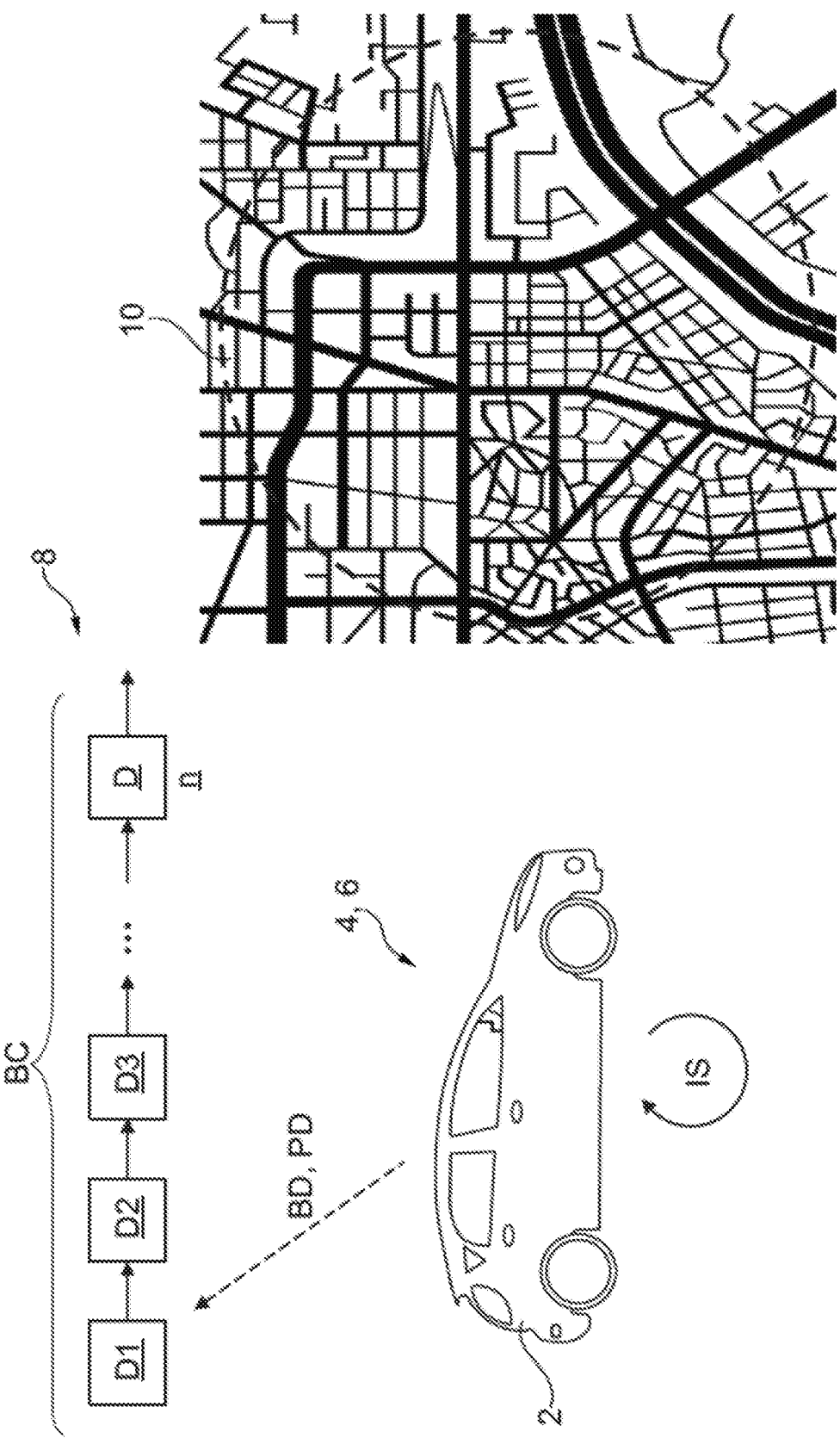
FIG. 1 illustrates a schematic illustration of a scenario in which a hybrid electric vehicle drives into an environmental zone, according to some embodiments.

Referring to FIG. 1, a hybrid electric vehicle 2 driving into an environmental zone 10 is illustrated. Hybrid electric vehicle 2 refers here to a vehicle that comprises a drivetrain 4 with a motor-drivable electric machine as a first traction motor and with a combustion engine, e.g. a gasoline or diesel engine, as a second traction motor.

Such a hybrid electric vehicle 2 can—depending on its configuration—be operated purely electrically and thus with zero emissions, partially electrically and thus with reduced emissions, and/or purely operated by the combustion engine and thus entailing emissions. In other words, the hybrid electric vehicle 2 can be a full hybrid or can comprise a range extender.

The hybrid electric vehicle 2 can further be designed in the present exemplary embodiment as a plug-in hybrid (PHEV). In a plug-in hybrid, the batteries of a traction battery can be charged by the combustion engine alone or via the power grid. In this scheme, increased emphasis is placed on an enlargement of the battery capacity in order to be able also to cover larger distances without local emissions. With sufficient capacity, short distances (of up to about 60 to 80 kilometers) can be covered exclusively in the zero-emission electric operating mode, while the combustion engine is only used as a generator for recharging the traction batteries in order to enable larger distances as well. Through the possible operation with the combustion engine alone, larger distances are possible even when the traction battery is empty.

The hybrid electric vehicle 2 comprises, in the present exemplary embodiment, a control device 6, which is designed to transmit position data PD representing a position (e.g., geographic location) of the hybrid electric vehicle 2 and operating data BD representing an operating state of the drivetrain 4 to a blockchain environment 8. The operating state may include a zero-emission mode (i.e., the hybrid electric vehicle 2 is operating using the traction battery and not the traction engine), a partial-emission mode (i.e., the hybrid electric vehicle 2 is operating using the traction battery and the traction engine), or a full-emission mode (i.e., the hybrid electric vehicle 2 is operating using the traction engine and not the traction battery). The control device 6 can comprise hardware and/or software components for this purpose and for the task and functions described below. Hybrid electric vehicle 2 may be, for example, vehicle system 400 as described with respect to FIG. 4.

Both the position data PD and the operating data BD are, in the present exemplary embodiment, each datasets, i.e. position datasets or operating datasets. The position datasets or operating datasets comprise, in addition to the position data PD and the operating data BD, in some embodiments, for each dataset a timestamp in order to associate and evaluate the respective position data PD and operating data BD from the point of view of time also. Other than the present exemplary embodiment, the position datasets or operating datasets can, in addition to or as an alternative to the timestamps, comprise information regarding distances traveled in, for example, miles or kilometers.

In the present exemplary embodiment, the position data PD are read in with a position determination device, for example, a GPS module of the hybrid electric vehicle 2, while the operating data BD are read in from the control device 6 over a CAN bus of the hybrid electric vehicle 2. The position data PD and the operating data BD are transmitted wirelessly to the blockchain environment 8 via a GSM module (also not illustrated) that is connected to the control device 6.

The blockchain environment 8 in the present exemplary embodiment provides a distributed peer-to-peer network that serves to realize a computer-implemented method for the provision of data. The peer-to-peer network comprises a plurality of nodes. In addition to hardware components, each node also contains software components in the form of computer program products which involve a blockchain software (stack) whose tasks and functions will now be explained in detail. Hybrid electric vehicle 2 is one of the nodes.

A distributed ledger here refers to a special form of electronic data processing and storage. A distributed ledger indicates a non-central database that allows the participants in a network common write and read authorization. In contrast to a centrally managed database, a central instance that makes new entries into the database is not required in this network. New datasets can be added at any time by the participants themselves. A subsequent updating process ensures that all participants each have access to the latest status of the database. A blockchain BC is a special embodiment of the distributed ledger.

A blockchain BC here refers to a continuously extendable list of data blocks D1, D2, D3, . . . Dn that are chained together by means of cryptographic methods. Each data block D1, D2, D3, . . . Dn typically here contains a cryptographically secure checksum of the previous data blocks D1, D2, D3, . . . Dn, possibly together with a timestamp and further data.

In the present exemplary embodiment, the blockchain BC comprises a first data block D1 with a first dataset and a second data block D2 with a second dataset, as well as a third data block D3 with a third dataset. The blockchain BC can be extended up to the data block DN. In the method flow, the first data block D1, with which the blockchain BC is started, is generated. The second data block D2 with the second dataset and the third data block D3 with the third dataset are then added, and the blockchain BC is thus extended. A respective checksum, such as, for example, a hash value, is assigned to each of the data blocks D1, D2, D3 . . . Dn. A hash function such as the SHA-256 algorithm (secure hash algorithm) can, for example, be used to determine the checksum. The first data block D1, since it is the first data block D1, thus does not have a checksum of a preceding block, while the second data block D2 comprises the first checksum of the first data block D1 and the third data block D3 comprises the second checksum of the second data block D2.

It is possible for different methods to be used, with which a consensus can be reached as to who may generate the next data block D1, D2, D3, . . . Dn. In the present exemplary embodiment, proof-of-authority verification is used in order to establish a consensus. The proof-of-authority verification is here transmitted by the control device 6 together with the position data PD and the operating data BD into the blockchain environment 8.

In contrast to a legitimation through proof-of-work, through the use of proof-of-authority verifications the necessary computing power is reduced, and it is possible at the same time to update the blockchain BC through the addition of new data blocks D1, D2, D3 . . . Dn at comparatively high speed. A proof-of-authority verification here confers the competence for validating transactions (e.g. through what are known as validators) and of grouping them into data blocks D1, D2, D3, . . . to an instance.

Checking the proof-of-authority verification here comprises the transmission of the data blocks D1, D2, D3, . . . Dn that are to be added to the blockchain together with the proof-of-authority verification to the other instances in the blockchain environment 8; these check the proof-of-authority verification and, if the check is successful, grant approval to add the data block D1, D2, D3, . . . Dn to the blockchain BC. A criterion such as, for example, that half of the instances grant an approval, can be specified for the approval.

The proof-of-authority verification can have at least a time-limited validity duration. Time-limited validity here means that the proof-of-authority verifications have an expiry date, and that once the expiry date of one of the further instances has been exceeded, it is no longer able to add further data blocks D1, D2, D3, . . . Dn to the blockchain BC. In this way it is possible, for example, to represent the situation that verification of a check must be provided within a predetermined period of time. A fraudulent use is in this way further opposed, since the proof-of-authority verifications do not have an unlimited lifetime.

The proof-of-authority verification can further comprise at least one content-related validity. A content-related validity means that the proof-of-authority verifications only authorize predetermined inputs to be made such as, for example, adding the position data PD and the operating data BD. The proof-of-authority verifications are, in other words, materially restricted. Fraudulent use can also be opposed in this way.

The proof-of-authority verification can further comprise at least one user-related validity. A user-related validity means that the proof-of-authority verifications only authorize a respective, predetermined instance that predetermined inputs can be made such as, for example, confirming that a check has been carried out. The proof-of-authority verifications are, in other words, individualized or user-related. Other than the present exemplary embodiment, proof-of-work or proof-of-stack can also be used.

Proof-of-work comprises the solution of a cryptographic task. In this way it is ensured that the generation of valid data blocks D1, D2, D3, . . . Dn is associated with a certain effort, so that a subsequent modification of the blockchain BC B, such as through a 51% manipulation, can be practically excluded. Proof of stake (abbreviation: PoS) refers to a method with which a consensus can be achieved in a blockchain environment 8 as to which instance may generate the next data block D2, D2, D3, . . . Dn. A weighted random choice is used here, wherein the weights of the individual instances are determined from, for example, the duration of participation. In contrast to proof-of-work, proof-of-stack manages without time-consuming and energy-intensive mining, and it is not possible to take over the total blockchain environment 8 merely through the possession of computing power (e.g., 51% manipulation).

The environmental zone 10 is a geographically defined region—usually in municipalities—in which the operation of vehicles that are not identified as having low emissions is forbidden, which is intended to serve to improve the local air quality.

The control device 6 is furthermore designed to provide an information signal IS through the evaluation of the position data PD and of the operating data BD. The information signal IS serves to inform a driver of the hybrid electric vehicle 2 that he is located in the environmental zone 10 and/or is driving with zero emissions or with reduced emissions or entailing emissions. For this purpose the information signal IS can operate a visual and/or acoustic indicator in the interior of the hybrid electric vehicle 2.

The control device 6 is furthermore designed to determine, for example through evaluating navigation data of a navigation system of the hybrid electric vehicle 2, whether the electrical energy stored in the traction battery of the hybrid electric vehicle 2 is sufficient, for example, to reach a driving destination located inside the environmental zone 10, or to leave the environmental zone 10 again, purely electrically and thus with zero emissions, or at least partially electrically and thus with reduced emissions.

Figure 2:
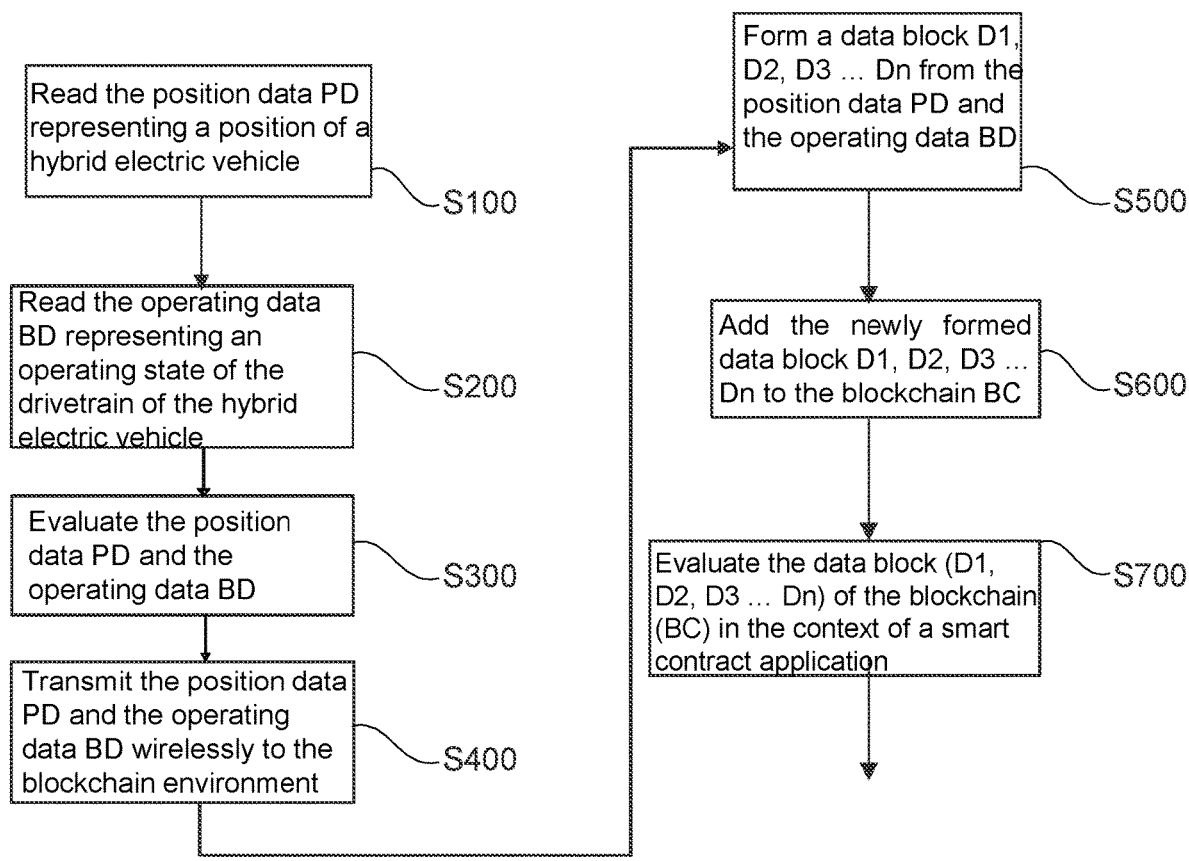
FIG. 2 illustrates a schematic illustration of a method flow, according to some embodiments.

Referring now to FIG. 2, a method for using blockchain for emission tracking is described. The position data PD representing a position of a hybrid electric vehicle 2 are read in by the control device 6 in a first step S100, and the operating data BD representing an operating state of the drivetrain 4 of the hybrid electric vehicle 2 are read in by the control device 6 in a second step S200. The position data PD permit a determination as to whether the hybrid electric vehicle 2 is geographically located in the environmental zone 10, while the operating data BD indicate whether the hybrid electric vehicle 2 is being operated purely electrically and thus with zero emissions, partially electrically and thus with reduced emissions, and/or purely operated by the combustion engine and thus entailing emissions.

The control device 6 evaluates the position data PD and the operating data BD in a further step S300, in order to provide an information signal IS. The information signal IS controls a visual and/or acoustic indicator in the interior of the hybrid electric vehicle 2 in order to inform a driver of the hybrid electric vehicle 2 that he is located in an environmental zone 10 and/or is driving with zero emissions or with reduced emissions or entailing emissions. An LED in the interior of the hybrid electric vehicle 2 is operated in the present exemplary embodiment. Other than the present exemplary embodiment it can be provided that the information signal IS effectuates a change in the operating mode of the hybrid electric vehicle into a purely electrical operating mode which is thus without emissions.

The position data PD and the operating data BD are transmitted wirelessly to the blockchain environment 8 in a further step S400. This can take place within a time interval with a predetermined duration, e.g. every 3 seconds. In the blockchain environment 8 a further data block D1, D2, D3 . . . Dn of the data blocks D1, D2, D3 . . . Dn is formed from the position data PD and the operating data BD in a further step S500. The blockchain environment 8 adds the newly formed data block D1, D2, D3 . . . Dn of the data blocks D1, D2, D3 . . . Dn to the blockchain BC in a further step S600. This data is thus now available in the blockchain in a manner that cannot be forged, in order to be further evaluated.

In a further step S700, a further instance such as, for example, a billing service provider, accesses the blockchain BC for the billing of toll fees. For example, the billing service provider charges toll fees that, for example, become due if driving is carried out with reduced emissions or entailing emissions in an environmental zone 10, while zero-emission driving within the environmental zone 10 is free from tolls.

Smart contracts may be used here, and a corresponding smart contract may be carried out. The smart contract thus charges the driver or owner of the hybrid electric vehicle 2 a predetermined billing amount if the electric vehicle 2 has moved within the environmental zone 10 with reduced emissions or entailing emissions. Emission-dependent toll fees can, in this way, for example, particularly easily and automatically be levied and billed. In addition or as an alternative, instead of toll fees, payments can also be triggered in the form of incentives for emission-free driving to the owner or driver of the hybrid electric vehicle 2.

Instances can also access the data archived in the blockchain BC. An instance can, for example, be a fleet operator of a vehicle fleet with a plurality of hybrid electric vehicles 2 who evaluates the data archived in the blockchain BC in order to reduce emissions across the fleet and/or to be able to give driving recommendations. A further instance can be an environmental authority whose tasks include the monitoring of the environmental zone 10. A further instance can be a vehicle manufacturer who evaluates the data archived in the blockchain BC in order to further improve the operation of the hybrid electric vehicle 2. A further instance can be a further service provider who evaluates the data archived in the blockchain BC in order to offer further services. The data read from the blockchain BC can then, for example, be represented in graphical form in order to simplify its evaluation.

Other than the present exemplary embodiment, the sequence of the steps can also be different. Multiple steps can, furthermore, be carried out at the same time, i.e. simultaneously. It is also possible for individual steps to be omitted.

Figure 3:
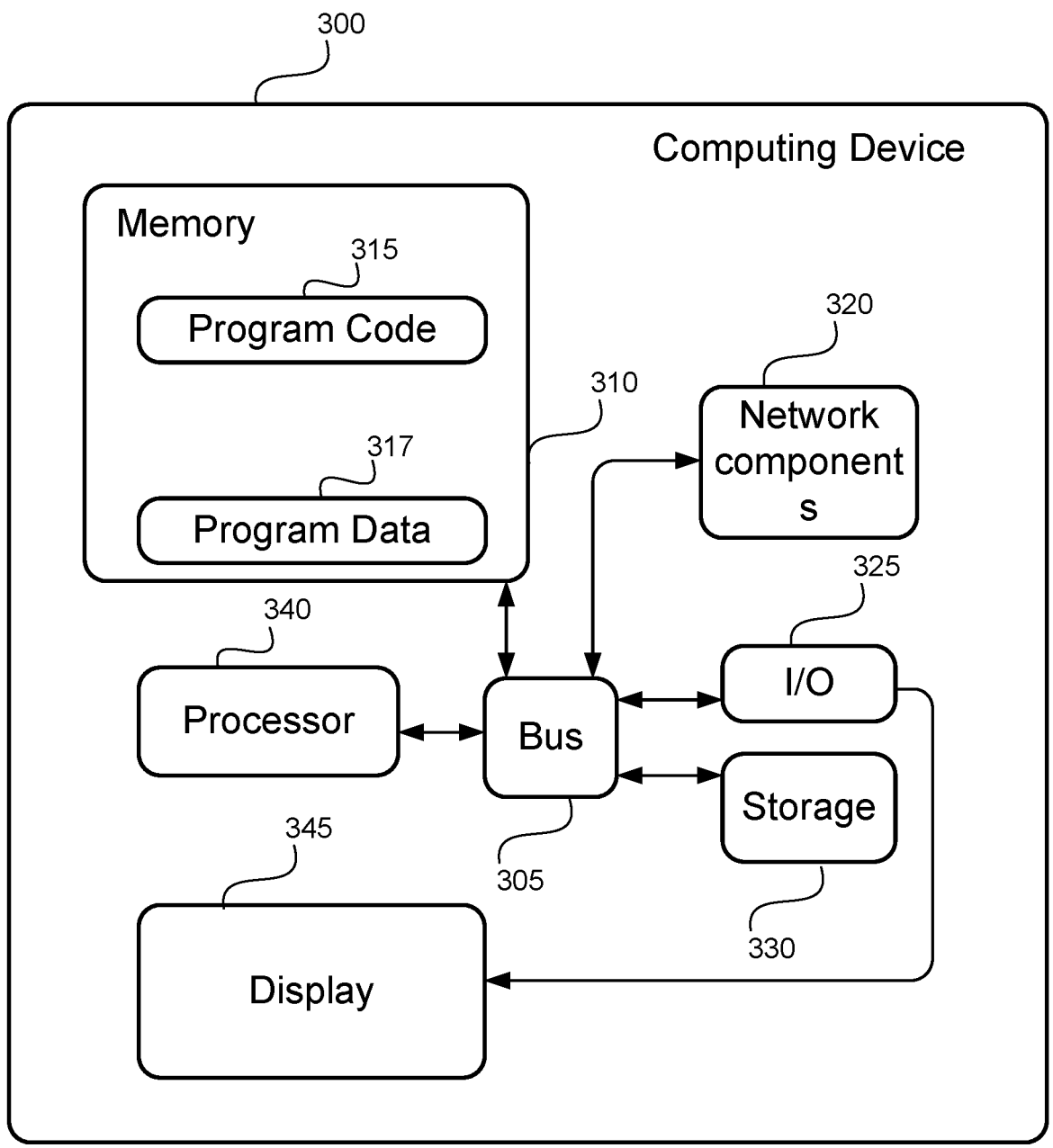
FIG. 3 illustrates a computer system, according to some embodiments.

FIG. 3 illustrates a block diagram of an example of a computer system 300. Computer system 300 can be any of the described computers or devices herein including, for example, control device 6. The computing device 300 can be or include, for example, an integrated computer, a laptop computer, desktop computer, tablet, server, or other electronic device.

The computing device 300 can include a processor 340 interfaced with other hardware via a bus 305. A memory 310 (e.g., a computer-readable memory device), which can include any suitable tangible (and non-transitory) computer readable medium, such as RAM, ROM, EEPROM, or the like, can embody program components (e.g., program code 315) that configure operation of the computing device 300. Memory 310 can store the program code 315, program data 317, or both. In some examples, the computing device 300 can include input/output ("I/O") interface components 325 (e.g., for interfacing with a display 345, keyboard, mouse, and the like) and additional storage 330.

The computing device 300 executes program code 315 that configures the processor 340 to perform one or more of the operations described herein. Examples of the program code 315 include, in various embodiments control device 6, or any other data or suitable systems or subsystems that perform one or more operations described herein. The program code 315 may be resident in the memory 310 or any suitable computer-readable medium and may be executed by the processor 340 or any other suitable processor.

The computing device 300 may generate or receive program data 317 by virtue of executing the program code 315. For example, input dataset, output dataset, and tracking dataset are all examples of program data 317 that may be used by the computing device 300 during execution of the program code 315.

The computing device 300 can include network components 320. Network components 320 can represent one or more of any components that facilitate a network connection. In some examples, the network components 320 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 320 can be wired and can include interfaces such as Ethernet, USB, or IEEE 1394.

Although FIG. 3 depicts a single computing device 300 with a single processor 340, the system can include any number of computing devices 300 and any number of processors 340. For example, multiple computing devices 300 or multiple processors 340 can be distributed over a wired or wireless network (e.g., a Wide Area Network, Local Area Network, or the Internet). The multiple computing devices 300 or multiple processors 340 can perform any of the steps of the present disclosure individually or in coordination with one another.

Figure 4:
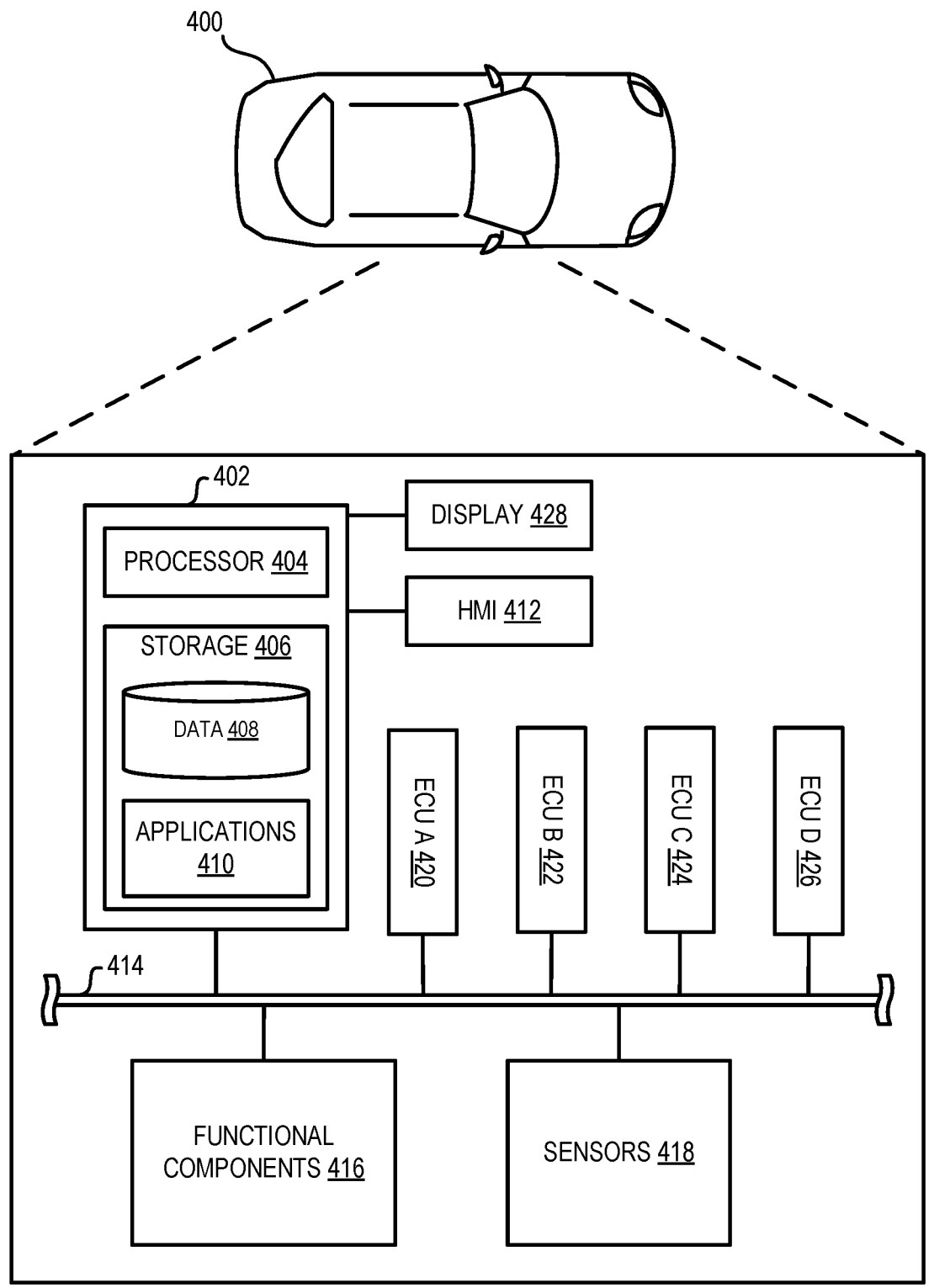
FIG. 4 illustrates a block diagram of a vehicle system, according to some embodiments.

FIG. 4 illustrates a block diagram of a vehicle system 400, according to some embodiments. The vehicle system 400 may include a computing system 402 configured to communicate over an in-vehicle network 414 (e.g., a CAN bus). The computing system 402 includes a processor 404 and storage 406. While a vehicle system 400 is shown in FIG. 4, the example components as illustrated are not intended to be limiting. Indeed, the vehicle system 400 may have more or fewer components, and additional or alternative components and/or implementations may be used. It should be noted that the use of a vehicle system 400 environment is illustrative, as the functional safety measures and security measures may be utilized in other types of systems such as flight control system in an airplane, or a medical device or industrial machine.

The vehicle system 400 may include various types of automobile, crossover utility vehicle (CUV), sport utility vehicle (SUV), truck, recreational vehicle (RV), boat, plane or other mobile machine for transporting people or goods. In many cases, the vehicle system 400 may be powered by an internal combustion engine. As another possibility, the vehicle system 400 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of the vehicle system 400 may vary, the capabilities of the vehicle system may correspondingly vary. As some other possibilities, vehicle system 400 may have different capabilities with respect to passenger capacity, towing ability and capacity, and storage volume.

The computing system 402 may include a Human Machine Interface (HMI) 412 and a display 428 for user interaction with the computing system 402. An example computing system 402 may be the SYNC™ system provided by FORD MOTOR COMPANY™ of Dearborn, Mich. In some examples the display 428 may include a vehicle infotainment system including one or more displays. The HMI 412 may be configured to support voice command and BLUETOOTH™ interfaces with the driver and driver carry-on devices, receive user input via various buttons or other controls, and provide vehicle status information to a driver or other vehicle system 400 occupants. For instance, the computing system 402 may interface with one or more buttons or other HMI 412 configured to invoke functions on the computing system 402 (e.g., steering wheel audio buttons, a push-to-talk button, instrument panel controls, etc.). The computing system 402 may also drive or otherwise communicate with the display 428 configured to provide visual output to vehicle occupants, e.g., by way of a video controller. In some cases, the display 428 may be a touch screen further configured to receive user touch input via the video controller, while in other cases the display 428 may be a display only, without touch input capabilities. In an example, the display 428 may be a head unit display included in a center console area of the vehicle system 400. In another example, the display 428 may be a screen of a gauge cluster of the vehicle system 400.

The computing system 402 may further include various types of computing apparatus in support of performance of the functions of the computing system 402 described herein. In an example, the computing system 402 may include one or more processors 404 configured to execute computer instructions, and a storage 406 medium on which computer-executable instructions and/or data may be maintained. A computer-readable medium (also referred to as a processor-readable medium or storage 406) includes any non-transitory (e.g., tangible) medium that participates in providing data (e.g., instructions) that may be read by a computer (e.g., by the one or more processors 404). In general, the processor 404 receives instructions and/or data, e.g., from the storage 406, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C #, Fortran, Pascal, Visual Basic, Python, Java Script, Perl, PL/SQL, etc. The storage 406 may include divisions for data 408 and applications 410. The data 408 may store information such as databases and other such information. The applications 410 may store the computer-executable instructions or other such instructions executable by the processor 404.

The computing system 402 may be configured to communicate with mobile devices of the vehicle system 400 occupants. The mobile devices may be any of various types of portable computing device, such as cellular phones, tablet computers, smart watches, laptop computers, portable music players, or other devices capable of communication with the computing system 402. As with the computing system 402, the mobile device may include one or more processors configured to execute computer instructions, and a storage medium on which the computer-executable instructions and/or data may be maintained. In some examples, the computing system 402 may include a wireless transceiver (e.g., a BLUETOOTH™ controller, a ZIGBEE™ transceiver, a Wi-Fi transceiver, etc.) configured to communicate with a compatible wireless transceiver of the mobile device. Additionally, or alternately, the computing system 402 may communicate with the mobile device over a wired connection, such as via a USB connection between the mobile device and a Universal Serial Bus (USB) subsystem of the computing system 402.

The computing system 402 may be further configured to communicate with other components of the vehicle system 400 via one or more in-vehicle networks 414. The in-vehicle networks 414 may include one or more of a vehicle controller area network (CAN), an Ethernet network, or a media oriented system transfer (MOST), as some examples. The in-vehicle networks 414 may allow the computing system 402 to communicate with other units of the vehicle system 400, such as ECU A 420, ECU B 422, ECU C 424, and ECU D 426. The ECUs 420, 422, 424, and 426 may include various electrical or electromechanical systems of the vehicle system 400 or control various subsystems of the vehicle system 400. Some non-limiting examples of ECUs include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle system 400); a radio transceiver module configured to communicate with key fobs or other vehicle system 400 devices, a climate control management module configured to provide control and monitoring of heating and cooling system components (e.g., compressor clutch and blower fan control, temperature sensor information, etc.) as well as a transmission control module, a brake control module, a central timing module, a suspension control module, a vehicle modem (which may not be present in some configurations), a global positioning system (GPS) module configured to provide vehicle system 400 location and heading information, and various other vehicle ECUs configured to corporate with the computing system 402. The subsystems controlled by the various ECUs may include functional components 416 of the vehicle system 400 including elements such as the powertrain, engine, brakes, lights, steering components, and the like. Additionally, some or all of the functional components 416 may include sensors 418 as well as additional sensors equipped to the vehicle system 400 for detecting various states, positions, proximity, temperature, and the like of the vehicle system 400 and subsystems thereof. The ECUs 420, 422, 424, 426 may communicate with the computing system 402 as well as the functional components 416 and the sensors 418 over the in-vehicle network 414. While only four ECUs are depicted in FIG. 4, any number (more or fewer) of ECUs may be included in vehicle system 400.

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

What is claimed is:

1. A computer-implemented method, comprising:
reading position data representing a position of a hybrid electric vehicle;
reading operating data representing an operating state of a drivetrain of the hybrid electric vehicle;
performing an evaluation of the position data and the operating data;
providing an information signal based on the evaluation of the position data and the operating data, the information including the position being located in an environmental zone, and an operating state of the hybrid electric vehicle, wherein the operating state indicates the drivetrain is in a zero emission mode, a reduced emission mode or a full emission mode;
forming a data block comprising the position data and the operating data; and
adding the data block to a blockchain on a blockchain environment by wirelessly transmitting the data block to the blockchain environment.

2. The computer-implemented method of claim 1, further comprising:
evaluating the data block of the blockchain in the context of a smart contract application; and
automatically executing an action when conditions of the smart contract are satisfied.

3. The computer-implemented method of claim 1, further comprising:
automatically paying a toll fee based on the data block.

4. A non-transitory computer-readable memory device having stored thereon instructions that, upon execution by one or more processors, cause the one or more processors to:
read position data representing a position of a hybrid electric vehicle;
read operating data representing an operating state of a drivetrain of the hybrid electric vehicle;
perform an evaluation of the position data and the operating data;
provide an information signal based on the evaluation of the position data and the operating data, the information including the position being located in an environmental zone, and an operating state of the hybrid electric vehicle, wherein the operating state indicates the drivetrain is in a zero emission mode, a reduced emission mode or a full emission mode;
form a data block comprising the position data and the operating data; and
add the data block to a blockchain on a blockchain environment by wirelessly transmitting the data block to the blockchain environment.

5. The non-transitory computer-readable memory device of claim 4, wherein the instructions comprise further instructions that, upon execution by the one or more processors, cause the one or more processors to:
evaluate the data block of the blockchain in the context of a smart contract application; and
automatically execute an action when conditions of the smart contract are satisfied.

6. The non-transitory computer-readable memory device of claim 4, wherein the instructions comprise further instructions that, upon execution by the one or more processors, cause the one or more processors to:
automatically pay a toll fee based on the data block.

7. A hybrid electric vehicle comprising:
a position determination device for providing position data representing a position of the hybrid electric vehicle;
a drivetrain having operating data comprising an operating state of the drivetrain; and
a control device configured to:
perform an evaluation of the position data and the operating data;
provide an information signal based on the evaluation of the position data and the operating data, the information including the position being located in an environmental zone, and an operating state of the hybrid electric vehicle, wherein the operating state indicates the drivetrain is in a zero emission mode, a reduced emission mode or a full emission mode; and
wirelessly transmit the position data and the operating data to a blockchain environment.

8. The hybrid electric vehicle of claim 7, wherein the control device is further configured to evaluate a data block of the blockchain in the context of a smart contract application and automatically execute an action when conditions of the smart contract are satisfied.

9. The hybrid electric vehicle of claim 7, wherein the control device is further configured to automatically pay a toll fee based on the position data and the operating data.

* * * * *